United States Patent

Kraus

[11] 3,941,004
[45] Mar. 2, 1976

[54] TRACTION ROLLER TRANSMISSION

[76] Inventor: Charles Edward Kraus, 3602 Mount Bonnell Road, Austin, Tex. 78731

[22] Filed: Nov. 25, 1974

[21] Appl. No.: 526,831

Related U.S. Application Data

[63] Continuation-in-part of Ser. No. 366,068, June 1, 1973, abandoned.

[52] U.S. Cl. ........................... 74/206; 74/798
[51] Int. Cl.² ................. F16H 13/02; F16H 13/06
[58] Field of Search ............ 74/206, 208, 798, 211; 184/11 R

[56] References Cited
UNITED STATES PATENTS

| | | |
|---|---|---|
| 1,106,246 | 8/1914 | Schoedelin........................ 74/206 |
| 1,212,462 | 1/1917 | Donnelly........................... 74/206 |
| 3,380,312 | 4/1968 | Barske............................... 74/206 |
| 3,848,476 | 11/1974 | Kraus................................. 74/206 |

Primary Examiner—Samuel Scott
Assistant Examiner—A. Russell Burke

[57] ABSTRACT

A traction roller transmission having traction rollers disposed in firm frictional engagement with a traction surface for the transmission of power between the traction rollers and the traction surface. Guide means which are in alignment with the traction surface and provided adjacent the side faces of the traction rollers such that lubricant present in the transmission is drawn between the roller side faces and the guide means and forms pressurized lubricant pads guiding the rollers into alignment with the traction surface.

9 Claims, 2 Drawing Figures

U.S. Patent   March 2, 1976   3,941,004
FIG.1
FIG.2
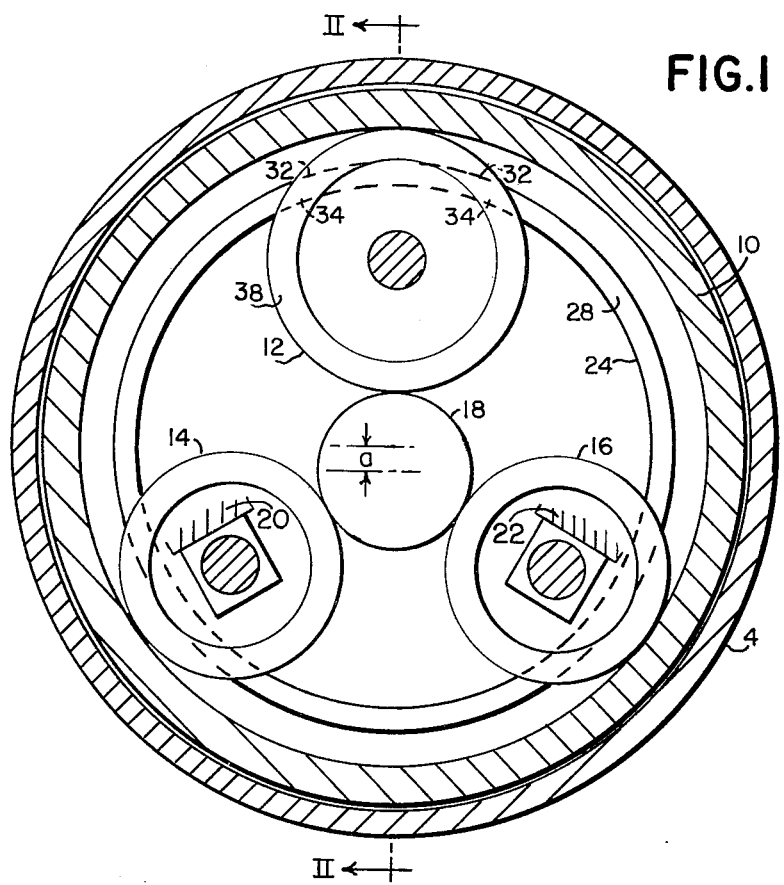
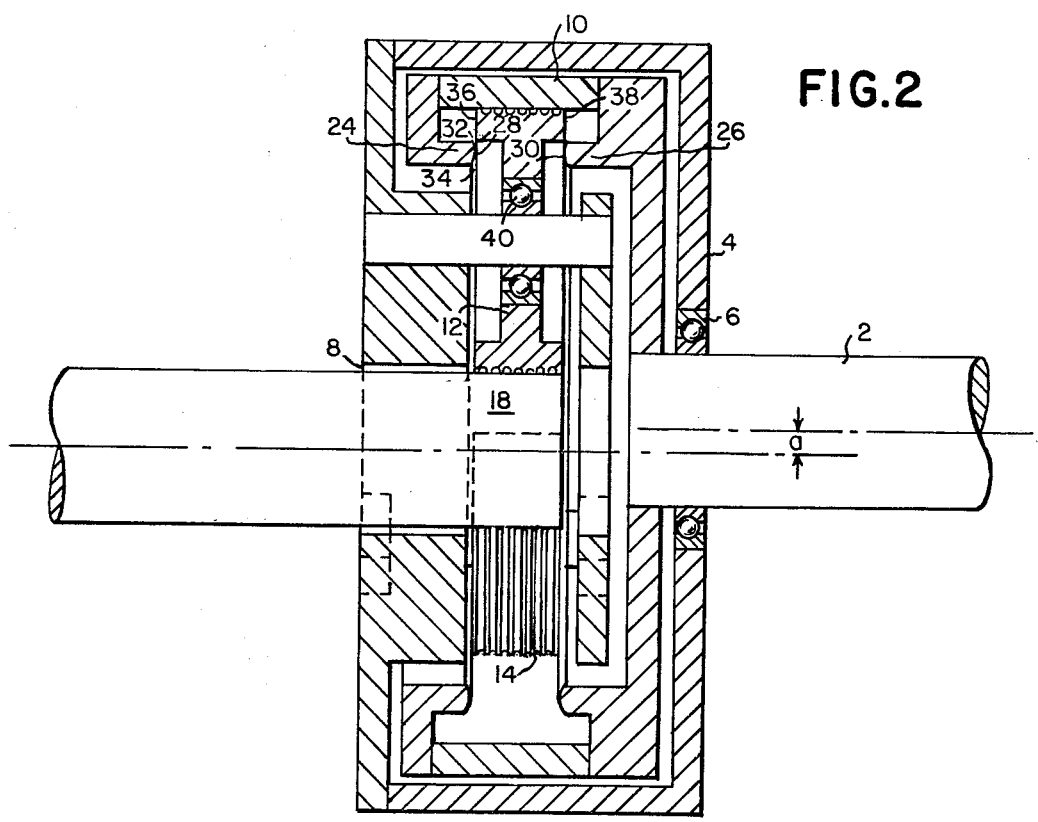

TRACTION ROLLER TRANSMISSION

CROSS REFERENCE TO RELATED APPLICATION

This application is a continuation-in-part application of patent application Ser. No. 366,068, now abandoned, filed June 1, 1973 by Charles E. Kraus.

BACKGROUND OF THE INVENTION

The invention relates to fixed-ratio traction roller transmissions.

In traction roller transmissions, large forces are required to engage the traction rollers with each other in order to facilitate transmission of large torques. The maximum tangential forces which are effective at the running surfaces of the traction rollers where they are in engagement with each other depend on the design and occur just before slipping. However, large forces are also effective in axial direction of the traction rollers if the axes of the rollers are not perfectly parallel to each other. In fact, the axial forces caused by incorrect parallel alignment of two rollers are always at the maximum value that is obtainable at the momentary forces effective to engage the rollers with each other even if the tangential forces are far from the value where slipping would occur.

As it is practically impossible to maintain the traction roller axes perfectly parallel, such axial forces equal to the maximum tangential forces are effective practically at all times. This causes not only a heavy load on the roller bearings and heavy wear of the running surfaces of the rollers but also reduces the torque that can be transmitted by the transmission.

Traction roller transmissions of the type to which the present invention is applicable are disclosed for example in U.S. Pats. Nos. 1,093,922; 1,212,462; 3,380,312 and in the present applicant's U.S. Pat. No. 3,776,051.

In the arrangement shown in U.S. Pat. No. 3,380,312 one set of rollers is provided with shoulders between which the respective other rollers are received. However, although the rollers are retained in their proper axial positions relative to each other, this arrangement cannot maintain the roller axes in perfectly parallel alignment.

SUMMARY OF THE INVENTION

In a traction roller transmission, at least two traction rollers have circular traction surfaces disposed in firm engagement with each other. One of the traction rollers has side faces, and guide means which are in radial alignment with the other traction roller are arranged adjacent the side faces of the one traction roller such that lubricant present in the transmission is drawn between the roller side faces and the guide means where it forms pressure pads for guiding the one roller into parallel alignment with the other roller.

BRIEF DESCRIPTION OF THE DRAWINGS

FIG. 1 shows schematically the preferred arrangement of the invention wherein three traction rollers are disposed in the space between the sun roller and the traction ring, and FIG. 2 is a cross-sectional view of the drive arrangement structure taken along line II—II of FIG. 1.

DESCRIPTION OF THE PREFERRED EMBODIMENT

FIG. 1 shows the arrangement of the invention in a transmission of the type as described in U.S. Pat. No. 1,093,922, wherein a traction ring 10 surrounds three traction rollers 12, 14, 16 engaging therebetween a sun roller 18 for the transmission of power between the traction ring 10 and the sun roller 18. The sun roller 18 is connected to, or is, the end of an input shaft and the traction ring 10 is mounted on an output shaft if the transmission is used as a speed reducer. The axes of the sun roller 18 and the traction ring 10 are parallel to, but displaced from, each other by a distance a so that, between the traction ring 10 and the sun roller 18, an annular path of varying width is formed. The roller 12 is disposed in the widest path area and the rollers 14 and 16 are disposed in the narrowing path areas. Both rollers 14 and 16 are free to move into the narrowing path but their movement out of the narrowing path is restricted by abutments 20 and 22 as for example shown in U.S. Pat. No. 1,093,922 or as explained in this applicant's U.S. Pat. No. 3,776,051 issued Dec. 4, 1973. Such an arrangement forces all the traction rollers 12, 14, 16 into firm engagement with the sun roller 18 and the traction ring 10 for the transmission of motion between the sun roller 18 and the traction ring 10.

To guide the traction rollers 12, 14 and 16, the traction ring 10 is provided with guide rails 24, 26 as more clearly shown in FIG. 2. The guide rails 24, 26 are flanges which are connected at their radially outer ends to the ring 10 and which have, adjacent their radially inner ends, opposite annular guide surfaces 28 and 30 disposed closely adjacent the traction rollers 12, 14, 16 for guiding the traction rollers into parallel and radial alignment with the traction ring 10 during operation of the transmission. The guide surfaces 28 and 30 are preferably bevelled in, with respect to the axis of the traction ring, radial direction to form wedge areas 32 and 34 between the side walls of the traction rollers and the guide surfaces at their radially outer and inner ends. Lubricant which is present in the transmission adheres to the roller side faces and the guide surfaces and is drawn into the space between the side faces and the guide rails.

The side faces of the traction rollers are preferably formed on rins 36 and 38 with the roller side faces and the guide surfaces being arranged in closely spaced parallel planes. The guide surfaces 28 and 30 are advantageously arranged inwardly from the ring 10 a certain distance such that the wedge areas 32, 34 between the roller rims 36 and 38 and the guide surfaces 28 and 30 are formed at a certain distance from a plane through the axes of the sun roller 18 and the particular traction roller 12. The lubricant is introduced into the transmission and applied to the surfaces of the guide means and the side faces of the roller in any well known manner. It may be applied under pressure or by a splash system or by means of a lubricant sump into which the guide means or rollers submerge. The lubricant just has to be there during operation. The adhesion forces which cause drawing of lubricant between the guide means and the rollers are very strong near the surfaces of the guide means and the rollers. The lubricant drawn into the wedge areas 32, 34 forms a pressurized lubricant pad wherein the pressure increases or decreases greatly when the gaps between the guide surfaces 28 and 30 and the rims 36 and 38, respectively, increase or decrease. As the guide means and the rollers move relative to each other that is — with respect to the lubricant pad — in opposite directions, the guide means pulls the lubricant in one, the rotatable means pulls it in the opposite direction. The narrower the gap, the higher the adhesion forces and the larger the pressure in the respective lubricant pad. The wider the gap the smaller are the adhesion forces in the center of the gap and the smaller the pressure in the respective lubricant pad. This, of course, causes the rollers to remain in the center between the guide means. The greater the distance of the wedge areas 32, 34 from the plane through the axes of the sun roller and the particular traction roller the larger a moment is created which corrects the rolling direction of the rollers and guides them into proper parallel and axial alignment with the ring 10 without engagement between the guide surfaces and the side faces of the rollers and, accordingly, without wear.

The pressures generated in the lubricant pads between the guide surfaces 28 and 30 and the rims 36 and 38 of the traction rollers are actually so large that a sufficient correcting moment can be generated even if the gaps between guide surfaces and the rims are large enough to avoid noticeable drag. The rollers, of course, must be free to be guided by the guide rails, however, the corrections are normally of such a small value that no special bearings and no special support structure for the rollers need to be provided. A single ball bearing 40 for supporting a roller as shown in FIG. 2 provides normally sufficient freedom for corrections. For larger units, the rollers may be supported by a double row of loosely assembled ball bearings with outwardly diverging contact angles or even by a bearing using barrel rollers.

Traction rollers of small diameters may not offer sufficient space for the reception of a bearing inside the roller. Then it may be necessary to support the roller shaft in such a manner that tilting of the shaft is possible to permit the roller to be brought into proper position with respect to the ring 10.

The traction roller transmission as described may be part of an engine drive and disposed within the housing of a variable speed transmission, for example, or may be disposed in its own housing as shown in FIG. 2, where the traction ring 10 is shown supported by shaft 2 within a housing 4 by a bearing 6 and the sun roller 18 extends through an opening 8 in the housing 4.

With the arrangement described, the rollers are maintained in proper alignment by hydraulic forces and, as a result, the wear of the roller and the ring surfaces is minimized.

However, the invention is not limited to the arrangement as described. It is also applicable to regular friction wheel transmissions with the guide rail associated with, and arranged radially outwardly of the outer surface of, one of the wheels. Also, the side faces of the rollers may be bevelled in radial direction in addition to, or instead of, the guide rail surfaces.

Furthermore, though the guide means have been shown in the drawings to be supported by the traction ring and rotatable therewith, they may be mounted on the transmission housing at opposite sides of the traction rollers. Then, that is if not rotatable with the traction ring but mounted on the housing, the guide means do not need to be of annular shape but may be formed by housing wall portions arranged adjacent the rollers.

What is claimed is:

1. In a transmission comprising at least two rotatable means having annular traction surfaces disposed in frictional engagement with each other, one of said rotatable means having annular side faces formed at its opposite ends; guide means provided with guide surfaces arranged adjacent said one, and in radial alignment with the other of said rotatable means, said guide surfaces being radially spaced from the traction surface of said other rotatable means such that, during operation of the transmission, said side faces are in motion relative to said guide surfaces, said guide surfaces and said side faces being arranged in closely spaced parallel planes thereby providing gaps between said guide surfaces and side faces so as to cause lubricant present in the transmission and adhering to said guide surfaces and annular side faces to be drawn into the gaps between the side faces and the guide surfaces and to form therein pressurized lubricant pads steering said one rotatable means into parallel and radial alignment with said other rotatable means.

2. A transmission as recited in claim 1, and comprising input and output shafts, said other rotatable means being a ring supported for rotation with one of said shafts, a sun roller associated with the other shaft for rotation therewith and disposed within said ring in radially spaced relationship therefrom, said one rotatable means comprising traction rollers disposed in the space between, and in frictional engagement with, said sun roller and said ring.

3. A transmission as recited in claim 2, wherein said guide means are flanges mounted on opposite sides of said ring and receiving therebetween said traction rollers.

4. A transmission as recited in claim 1, wherein at least one of said rotatable means and said guide means has radially bevelled side faces or, respectively, guide surfaces to facilitate formation of said lubricant pads in the gap between the side faces and the guide surfaces.

5. In a traction roller transmission having input and output shafts; a traction ring carried by one of said shafts for rotation therewith; a sun roller carried by the other of said shafts, said sun roller being arranged within said traction ring with its axis parallel to, but displaced from, the axis of said traction ring thereby to form an annular path of varying width between the sun roller and said traction ring; and a number of motion transmitting traction rollers disposed in said annular path in annularly spaced relationship, at least one of said rollers being free to be pulled into a narrowing section of said annular path to cause firm engagement of said traction rollers with said sun roller and said traction ring, the improvement comprising guide rails disposed at opposite sides of said annular path and having guide surfaces in radial alignment with said traction ring and receiving therebetween said traction rollers, said traction rollers having annular side faces at their opposite ends, said guide surfaces being radially spaced from the inner surface of said traction ring such that, during operation of the transmission, said annular side faces are in motion relative to said guide surfaces, said side faces and said guide surfaces being arranged in closely spaced parallel planes thereby providing gaps between side guide surfaces and side faces so as to cause lubricant present in the transmission and adhering to said guide surfaces and said annular side faces to be drawn into the gaps between the traction roller side faces and the guide surfaces and to form therein pressurized lubricant pads adapted to steer the traction rollers into parallel and radial alignment with said traction ring.

6. A transmission as recited in claim 5, wherein at least one of said guide surfaces and side faces are bevelled in a radial direction to form wedge-type gaps between the roller side faces and the guide surfaces thereby to facilitate entering of lubricant into said gaps.

7. A transmission as recited in claim 5, wherein said traction rollers have axially protruding rim portions on which said annular side faces are formed.

8. An arrangement as recited in claim 5, wherein said traction rollers are supported by bearings permitting sufficient freedom of movement to permit guidance of the rollers by the guide rails.

9. An arrangement as recited in claim 5, wherein said guide rails are flanges mounted on the opposite sides of said traction ring and having, at their radially inner ends, axial projections which form said guide surfaces.

* * * * *